(12) United States Patent
Kupka

(10) Patent No.: US 11,690,352 B2
(45) Date of Patent: Jul. 4, 2023

(54) PET TRAINING PAD WITH VISUALLY STIMULATING INDICIUMS FOR DICHROMATIC ANIMALS

(71) Applicant: Todd Kupka, Ashland, OR (US)

(72) Inventor: Todd Kupka, Ashland, OR (US)

( * ) Notice: Subject to any disclaimer, the term of this patent is extended or adjusted under 35 U.S.C. 154(b) by 0 days.

(21) Appl. No.: 17/720,909

(22) Filed: Apr. 14, 2022

(65) Prior Publication Data

US 2022/0330516 A1 Oct. 20, 2022

Related U.S. Application Data

(60) Provisional application No. 63/174,696, filed on Apr. 14, 2021.

(51) Int. Cl.
| | | |
|---|---|---|
| *A01K 1/015* | (2006.01) | |
| *A01K 15/02* | (2006.01) | |
| *B32B 3/08* | (2006.01) | |
| *B32B 3/30* | (2006.01) | |
| *B32B 7/02* | (2019.01) | |

(52) U.S. Cl.
CPC ............ *A01K 1/0157* (2013.01); *A01K 15/02* (2013.01); *B32B 3/08* (2013.01); *B32B 3/30* (2013.01); *B32B 7/02* (2013.01); *B32B 2307/404* (2013.01); *B32B 2307/726* (2013.01); *B32B 2307/7265* (2013.01); *B32B 2471/00* (2013.01)

(58) Field of Classification Search
CPC ........ A01K 1/0157; A01K 15/02; B32B 3/08; B32B 3/30; B32B 7/02; B32B 2307/404; B32B 2307/726; B32B 2307/7265; B32B 2471/00
See application file for complete search history.

(56) References Cited

U.S. PATENT DOCUMENTS

| | | | |
|---|---|---|---|
| 4,507,121 A | 3/1985 | Leung | |
| 6,120,867 A * | 9/2000 | Hamerski | ................. C09J 7/22 |
| | | | 428/317.1 |
| 6,710,221 B1 | 3/2004 | Pierce | |
| D575,986 S | 9/2008 | Cetera | |
| 8,163,132 B2 | 4/2012 | Kien | |
| 8,927,801 B2 | 1/2015 | Klofta | |

(Continued)

FOREIGN PATENT DOCUMENTS

| | | | | |
|---|---|---|---|---|
| EP | 510195 A1 * | 10/1992 | ........... | A01K 1/0107 |
| GB | 2195270 A * | 4/1988 | ............ | B41M 3/142 |
| JP | 2011177167 A | 9/2011 | | |

*Primary Examiner* — Frank J Vineis
*Assistant Examiner* — Donald M Flores, Jr.

(57) ABSTRACT

The present invention is a pet training pad apparatus suitable for excrement training for dichromatic animals. The pet training pad apparatus comprises a pad body and a visually stimulating indicium. The pad body comprises an excretion surface, an absorbent layer, and an impermeable layer. The visually stimulating indicium comprises at least one dichromatic vision detecting element. The absorbent layer is connected between the excretion surface and the impermeable layer. The visually stimulating indicium is connected along the excretion surface, opposite to the impermeable layer. The at least one dichromatic vision detecting element is distributed about the visually stimulating indicium, where the at least one dichromatic vision detecting element is configured to visually attract animals with dichromatic vision.

17 Claims, 4 Drawing Sheets

(56) References Cited

U.S. PATENT DOCUMENTS

| | | | |
|---|---|---|---|
| 2003/0188393 A1 | 10/2003 | Tindal | |
| 2006/0260556 A1* | 11/2006 | Renforth | A01K 1/0107 |
| | | | 119/169 |
| 2010/0100068 A1* | 4/2010 | Rodriguez | A61F 13/56 |
| | | | 604/385.23 |
| 2014/0331749 A1 | 11/2014 | Perissi | |
| 2015/0334985 A1* | 11/2015 | Takahashi | A01K 1/0107 |
| | | | 119/171 |
| 2017/0013799 A1* | 1/2017 | Bolton | A01K 1/0155 |
| 2018/0192609 A1 | 7/2018 | Mikacich | |

\* cited by examiner

PET TRAINING PAD WITH VISUALLY STIMULATING INDICIUMS FOR DICHROMATIC ANIMALS

FIELD OF THE INVENTION

The present invention relates to pet training pads. More specifically, pet training pads with visual designating features suitable for animals with dichromatic vision.

BACKGROUND OF THE INVENTION

Presently, puppy pads and similar domesticated animal restroom training articles are known to the art. Conventionally incorporating a flexible body with an absorbent layer therein or otherwise incorporated into a physically erected structure and constrained therein. However, there is a lack of absorbent articles, training apparatuses thereof that employ a pattern, signal, or other indicia with which the domesticated animal identifies in association to a particular stimulus such as relieving themselves in appropriate proximity thereof. Further, there lacks a relieving training apparatus that can facilitate use in varying light intensities such as in the dark.

It is therefore the objective of the present invention to introduce a body with an upper permeable first surface, an impermeable lower second surface, and an absorbent layer interstitially located therebetween, wherein the first surface has an indicia/indicium that incorporates at least two colors perceptible by the domesticated animal. Preferably, the at least two colors comprise yellow and blue as recent study has found these hues to be perceptible to canines particularly, thus providing a means of standing out to such as domesticated animal in a conventional home environment or similar. Further, an optional pheromone coating and an optional luminescence coating may be applied to the first surface and the indicia respectively to assist locating the present invention in a dark environment both by the owner and the domesticated animal. Further, the present invention presents at least one edge with an optional wall thereat that may mitigate splashing or overflow off of the first surface. Thus, by impregnating an optional luminescence coating and/or an optional pheromone coating on the top surface, the domesticated animal may more reliably locate the present invention in a darkened environment and further afford the owner awareness of the present invention to avoid disturbance/contact therewith. Further, by incorporating at least two colors upon the indicia, the domesticated animal may more reliably associate the particular pattern therewith in association to relieving themselves.

SUMMARY OF THE INVENTION

The present invention is a pet training pad apparatus suitable for excrement training for dichromatic animals. The pet training pad apparatus comprises a pad body and a visually stimulating indicium. The pad body comprises an excretion surface, an absorbent layer, and an impermeable layer. The visually stimulating indicium comprises at least one dichromatic vision detecting element. The absorbent layer is connected between the excretion surface and the impermeable layer. The visually stimulating indicium is connected along the excretion surface, opposite to the impermeable layer. The at least one dichromatic vision detecting element is distributed about the visually stimulating indicium, where the at least one dichromatic vision detecting element is configured to visually attract animals with dichromatic vision.

DETAIL DESCRIPTIONS OF THE INVENTION

Figure 1:
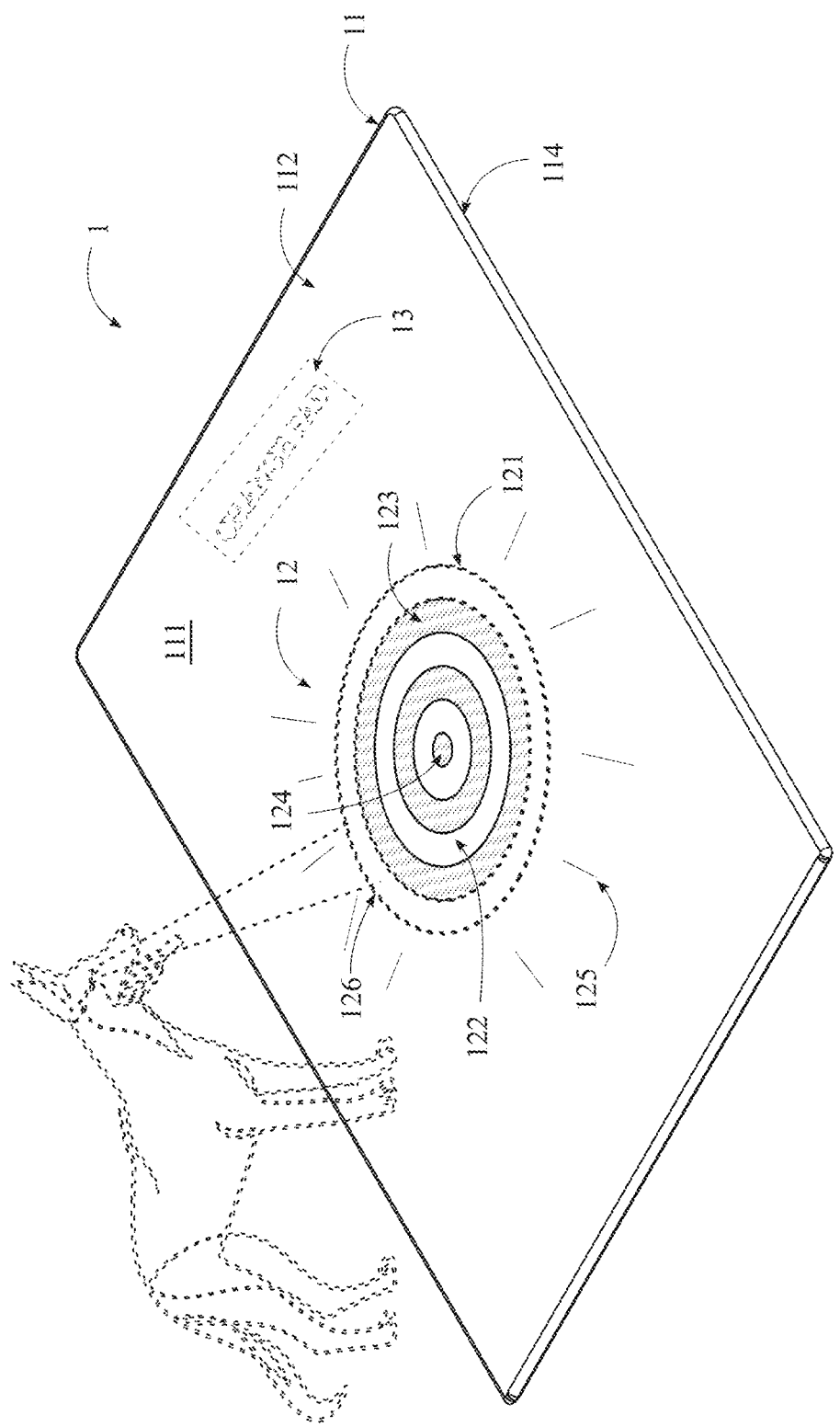
FIG. 1 is a top perspective view of the present invention that shows an illuminated indicium and a "CHANGE PAD" color changing indicator visible when activated when in contact with animal excrement, and a UV market pigment only visible to UV sensitive dichromatic animals.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances and should not be considered to be limiting to the scope of the present invention as a whole.

In reference to FIGS. 1-4, the present invention is a pet training pad apparatus 1 suitable for excrement training for dichromatic animals. The pet training pad apparatus 1 comprises a pad body 11 and a visually stimulating indicium 12. The pad body 11 comprises an excretion surface 111, an absorbent layer 112, and an impermeable layer 113. The visually stimulating indicium 12 comprises at least one dichromatic vision detecting element 121. The absorbent layer 112 is connected between the excretion surface 111 and the impermeable layer 113. The visually stimulating indicium 12 is connected along the excretion surface 111, opposite to the impermeable layer 113. The at least one dichromatic vision detecting element 121 is distributed about the visually stimulating indicium 12, where the at least one dichromatic vision detecting element 121 is configured to visually attract animals with dichromatic vision. In the preferred embodiment the pad body 11 takes the form of any suitable excrement pad chassis suitable for pet excrement training. In the preferred embodiment, the pad body 11 is rectangular in shape, but may take the form of any other suitable shape, such as, but not limited to circular pads, triangular pads, elliptical pads, or any other suitable shape. In the preferred embodiment, the pad body 11 is scaled to any suitable size for any animal. In the preferred embodiment, the visually stimulating indicium 12 takes the form of any suitable visually stimulating indicium 12 that is detectable by the animal in training. More specifically, the visually stimulating indicium 12 takes the form of any suitable design, such as, but not limited to bullseye targets, geometric shapes, fire hydrant indicium, or any other suitable design. In the preferred embodiment, the visually stimulating indicium 12 takes the form of a printed indicium but may take the form of any other suitable connection or application implement, such as, but not limited to embroidery stitching or connection means, decals, or any other suitable connection or application implement. In the preferred embodiment, the visually stimulating indicium 12 takes the form of a plurality of annular concentric rings, resembling a bulls-eye target.

In reference to FIGS. 1-4, the excretion surface 111 takes the form of the surface that the animal excretes along. More specifically, the excretion surface 111 is the upside most surface of the pad body 11 that supports and visually projects the visually stimulating indicium 12. The absorbent layer 112 takes the form of any suitable animal excretion absorbent implement, such as, but not limited to multi-layered absorbent fabrics, tissue paper, baking soda enriched absorbent fabrics, pheromone enriched absorbent fabrics, or any other suitable animal absorbent implement. In the preferred embodiment, the impermeable layer 113 takes the form of any suitable impermeable later that holds the liquid or semi-solid excrement along the bottom portion of the pad body 11. More specifically, the impermeable layer 113 prevents liquid or semi-solid excrement from leaking out of the pad body 11 and on to the flat surface the present invention is positioned along. In the preferred embodiment, the at least one dichromatic vision detecting element 121 takes the form of any suitable detecting element that visually attracts the animal in training with dichromatic vision to the visually stimulating indicium 12. More specifically, the at least one dichromatic vision detecting element 121 takes the form of yellow pigments, blue pigments, or a combination thereof in a specified pattern distributed along the visually stimulating indicium 12. In the preferred embodiment, the visually stimulating indicium 12 has a brightness value (L*) ranging from 0 to 100, a green-red component (a*) value of 0, and a blue-yellow component (b*) value ranging from 0 to 128 in an L*a*b color system. In the preferred embodiment, the visually stimulating indicium 12 has a brightness value (L*) ranging from 0 to 100, a green-red component (a*) value of 0, and a blue-yellow component (b*) value ranging from −128 to 0 in an L*a*b color system.

Figure 2:
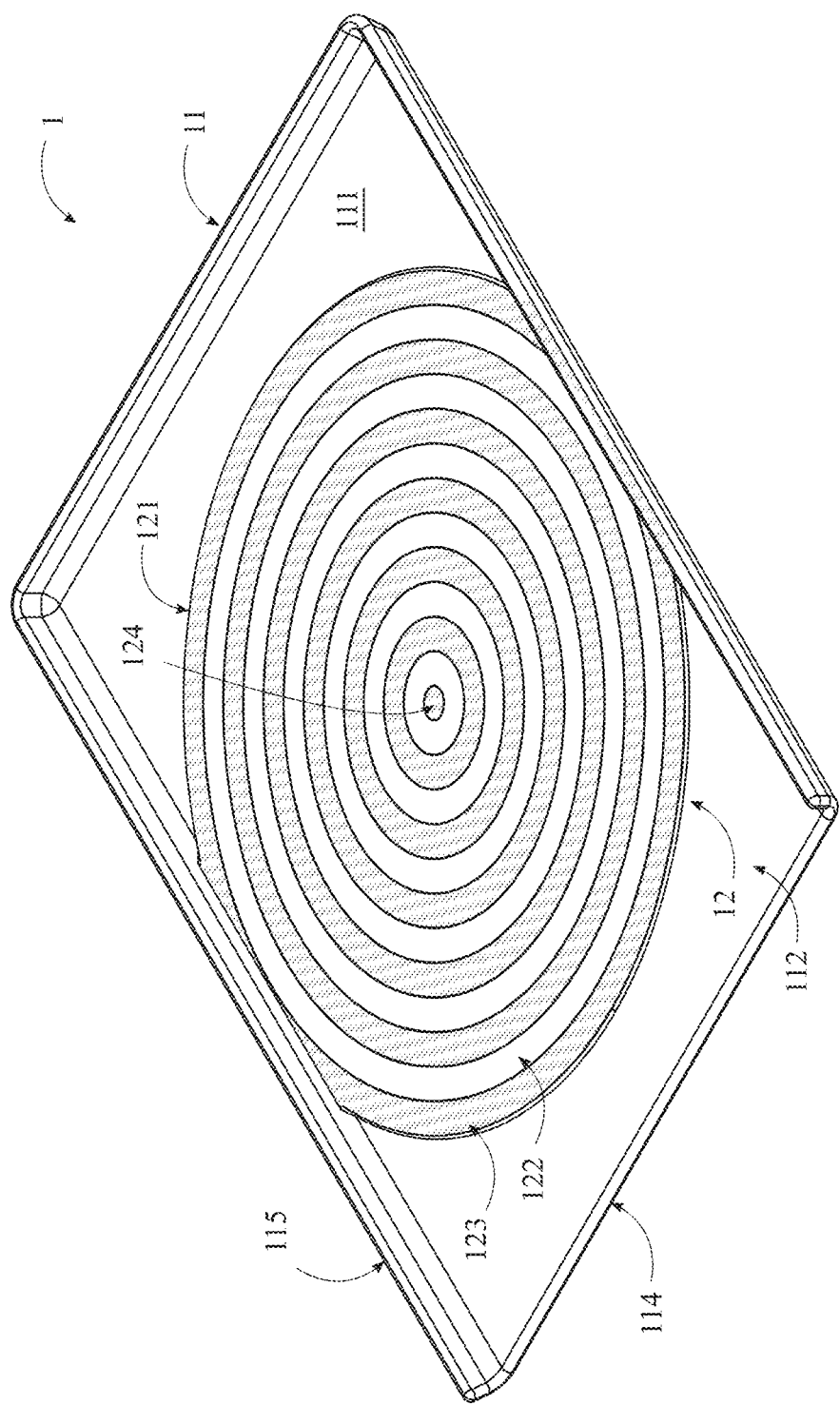
FIG. 2 is a top perspective view of the present invention that shows a raised boundary connected along an at least one edge.
Figure 3:
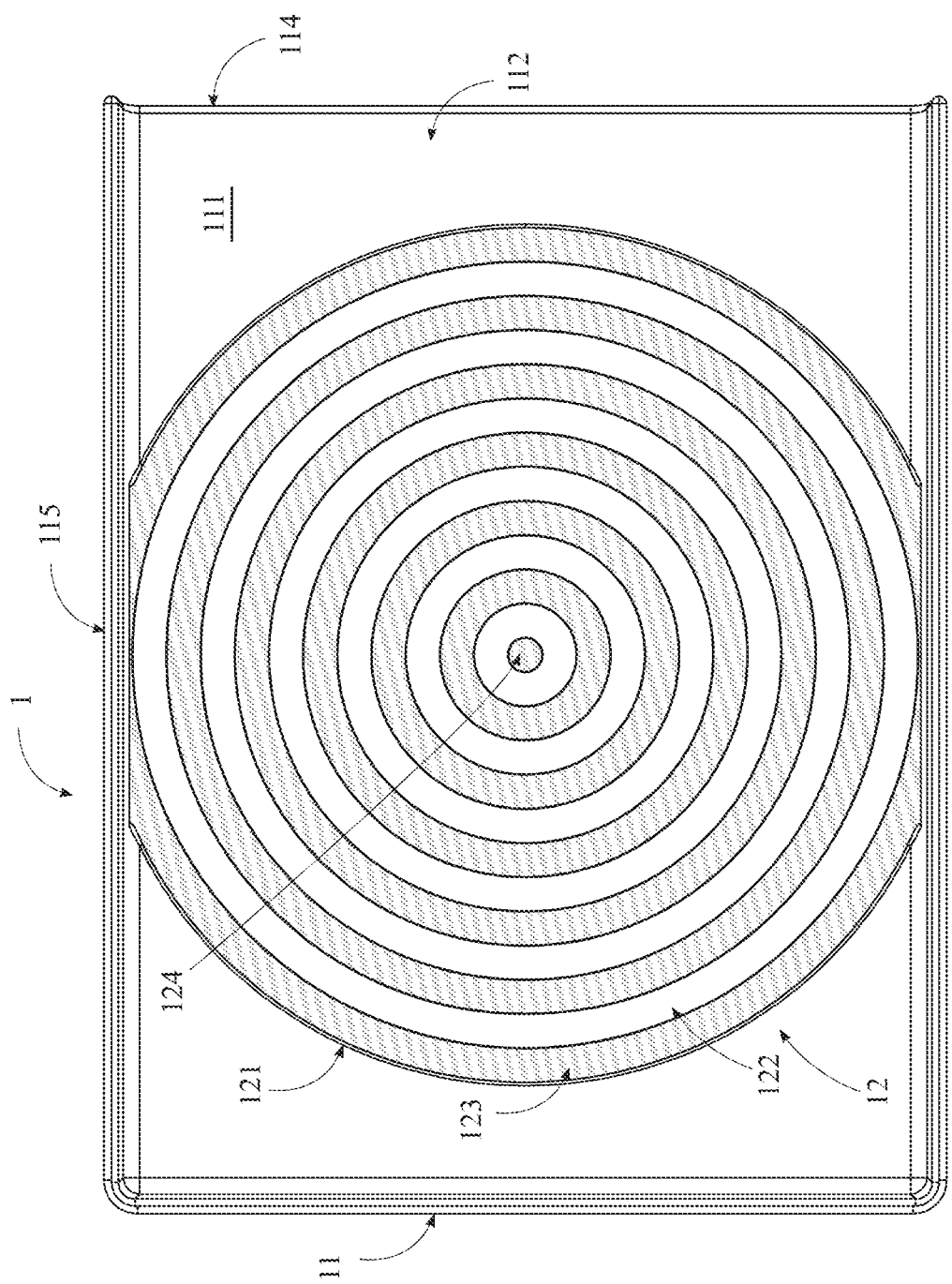
FIG. 3 is a top view of the present invention.

In reference to FIGS. 1-3, the visually stimulating indicium 12 comprises a pheromone receiving element 124. The pheromone receiving element 124 is connected along the visually stimulating indicium 12. In the preferred embodiment, the pheromone receiving element 124 takes the form of an absorbent felt pad that allows the user to apply excretion encouraging pheromones along the absorbent felt pad.

In reference to FIG. 1, the visually stimulating indicium 12 further comprises at least one luminescence element 125. The at least one luminescence element 125 is distributed about the visually stimulating indicium 12. In the preferred embodiment the at least one luminescence element 125 takes the form of photoluminescent implements that absorbs light and emits the light in low light settings, further serving as an additional visual dichromatic implement in low light situations.

In reference to FIGS. 1-4, the pad body 11 further comprises at least one edge 114. The at least one edge 114 is perimetrically connected along the pad body 11. The at least one edge 114 further comprises a raised boundary 115. The raised boundary 115 is connected along the at least one edge 114. In the preferred embodiment, the at least one edge 114 takes the form of the perimeter boundary of the pad body 11. In the preferred embodiment, the raise boundary takes the form of raised partitions that aid in containing and securing liquid, semi-solid, or solid excrement along the pad body 11.

In another embodiment, the visually stimulating indicium 12 is an indicium insert. The indicium insert is removably attached along the excretion surface 111. In this embodiment, the removably attached indicium insert allows the user to position the indicium insert along any portion of the excrement surface, or place the indicium insert along any other suitable surface.

In reference to FIGS. 1-4, the at least one dichromatic vision detecting element 121 comprises a first dichromatic vision detecting element 122. The first dichromatic vision detecting element 122 is connected along the visually stimulating indicium 12. In the preferred embodiment, the first dichromatic vision detecting element 122 has a brightness value (L*) ranging from 0 to 100, a green-red component (a*) value of 0, and a blue-yellow component (b*) value ranging from 0 to 128 in an L*a*b color system. In the preferred embodiment, the first dichromatic vision detecting element 122 has a brightness value (L*) ranging from 0 to 100, a green-red component (a*) value of 0, and a blue-yellow component (b*) value ranging from −128 to 0 in an L*a*b color system. In the preferred embodiment, the at least one dichromatic vision detecting element 121 comprises a second dichromatic vision detecting element 123. The second dichromatic vision detecting element 123 is connected along the visually stimulating indicium 12. In the preferred embodiment, the second dichromatic vision detecting element 123 has a brightness value (L*) ranging from 0 to 100, a green-red component (a*) value of 0, and a blue-yellow component (b*) value ranging from −128 to 0 in an L*a*b color system. In the preferred embodiment, the second dichromatic vision detecting element 123 has a brightness value (L*) ranging from 0 to 100, a green-red component (a*) value of 0, and a blue-yellow component (b*) value ranging from 0 to 128 in an L*a*b color system.

Figure 4:
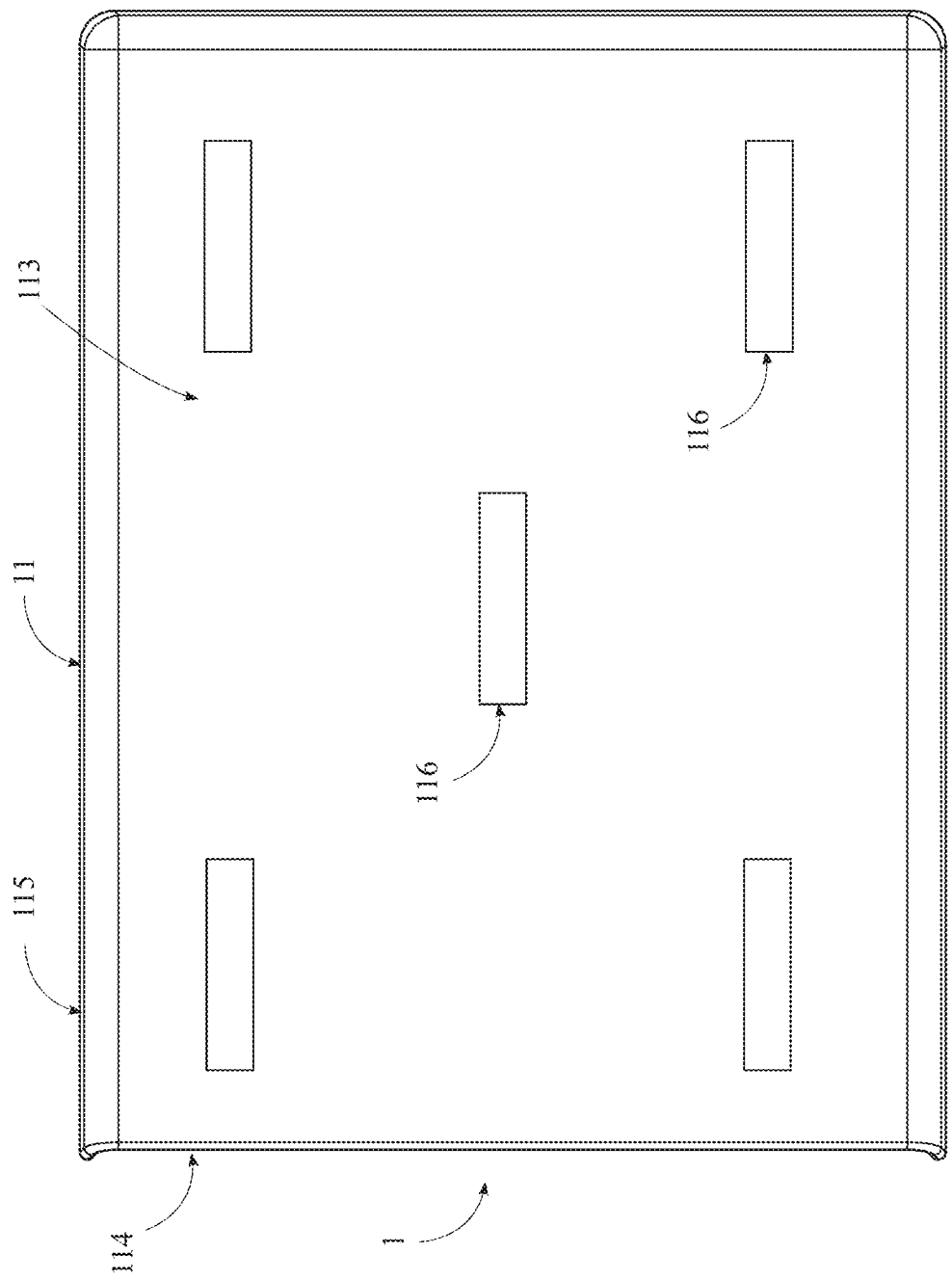
FIG. 4 is a bottom view of the present invention.

In reference to FIG. 4, the pad body 11 further comprises a plurality of mounting elements 116. The plurality of mounting elements 116 is distributed about the impermeable layer 113, opposite to the excretion surface 111. In the preferred embodiment, the plurality of mounting element takes the form of any suitable fastening means, such as, but not limited to double adhesive fasteners, hook and loop fasteners, or any other fastening implement to secure the permeable layer portion of the pad body 11 to a flat surface, corner, or any other suitable area.

In reference to FIG. 1, the pet training pad apparatus 1 further comprises a color changing indicator 13. The color changing indicator 13 is connected along the excretion surface 111. In the preferred embodiment, the color changing indicator 13 takes the form of any suitable color changing element that changes color when liquid, semi-solid, or solid excrement comes into contact with the excretion surface 111. In another embodiment, the visually stimulating indicium 12 further comprises at least one UV marker pigment 126. The UV marker pigment 126 is distributed along the visually stimulating indicium, as shown in FIG. 1. In the preferred embodiment, the UV marker pigment 126 takes the form of any suitable pigment that is detectable by UV light. More specifically, the UV marker pigment 126 serves as an additional dichromatic detecting feature distributed along the visually stimulating indicium 12, where the UV marker pigment 126 is configured to be detected by dichromatic animals that can detect UV coloration schemes under normal lighting conditions.

Although the invention has been explained in relation to its preferred embodiment, it is to be understood that many other possible modifications and variations can be made without departing from the spirit and scope of the invention as hereinafter claimed.

What is claimed is:

1. A pet training pad apparatus comprising:
    a pad body;
    a visually stimulating indicium;
    the pad body comprising an excretion surface, an absorbent layer, and an impermeable layer;
    the visually stimulating indicium comprising at least one dichromatic vision detecting element;
    the absorbent layer being connected between the excretion surface and the impermeable layer;
    the visually stimulating indicium being connected along the excretion surface, opposite to the impermeable layer;
    the at least one dichromatic vision detecting element being distributed about the visually stimulating indicium, wherein the at least one dichromatic vision detecting element is configured to visually attract animals with dichromatic vision;
    the visually stimulating indicium being an indicium insert; and
    the indicium insert being removably attached along the excretion surface.

2. The pet training pad apparatus as claimed in claim 1, wherein:
    the visually stimulating indicium further comprises a pheromone receiving element; and
    the pheromone receiving element being connected along the visually stimulating indicium.

3. The pet training pad apparatus as claimed in claim 1, wherein:
    the visually stimulating indicium further comprises at least one luminescence element; and
    the at least one luminescence element being distributed about the visually stimulating indicium.

4. The pet training pad apparatus as claimed claim 1, wherein:
    the pad body further comprises at least one edge; and
    the at least one edge being perimetrically connected along the pad body.

5. The pet training pad apparatus as claimed in claim 4, wherein:
    the at least one edge further comprises a raised boundary; and
    the raised boundary being connected along the at least one edge.

6. The pet training pad apparatus as claimed in claim 1, wherein the visually stimulating indicium takes the form of a plurality of annular concentric rings.

7. The pet training pad apparatus as claimed in claim 1, wherein:
    the at least one dichromatic vision detecting element further comprises a first dichromatic vision detecting element; and
    the first dichromatic vision detecting element being distributed along the visually stimulating indicium.

8. The pet training pad apparatus as claimed in claim 7, wherein the first dichromatic vision detecting element has a brightness value (L*) ranging from 0 to 100, a green-red component (a*) value of 0, and a blue-yellow component (b*) value ranging from 0 to 128 in an L*a*b color system.

9. The pet training pad apparatus as claimed in claim 7, wherein the first dichromatic vision detecting element has a brightness value (L*) ranging from 0 to 100, a green-red component (a*) value of 0, and a blue-yellow component (b*) value ranging from −128 to 0 in an L*a*b color system.

10. The pet training pad apparatus as claimed in claim 7, wherein:
    the at least one dichromatic vision detecting element further comprises a second dichromatic vision detecting element; and
    the second dichromatic vision detecting element being distributed along the visually stimulating indicium.

11. The pet training pad apparatus as claimed in claim 10, wherein the second dichromatic vision detecting element has a brightness value (L*) ranging from 0 to 100, a green-red component (a*) value of 0, and a blue-yellow component (b*) value ranging from −128 to 0 in an L*a*b color system.

12. The pet training pad apparatus as claimed in claim 10, wherein the second dichromatic vision detecting element has a brightness value (L*) ranging from 0 to 100, a green-red component (a*) value of 0, and a blue-yellow component (b*) value ranging from 0 to 128 in an L*a*b color system.

13. The pet training pad apparatus as claimed in claim 1, wherein the visually stimulating indicium has a brightness value (L*) ranging from 0 to 100, a green-red component (a*) value of 0, and a blue-yellow component (b*) value ranging from 0 to 128 in an L*a*b color system.

14. The pet training pad apparatus as claimed in claim 1, wherein the visually stimulating indicium has a brightness value (L*) ranging from 0 to 100, a green-red component (a*) value of 0, and a blue-yellow component (b*) value ranging from −128 to 0 in an L*a*b color system.

15. The pet training pad apparatus as claimed in claim 1, wherein:
    the pad body further comprises a plurality of mounting elements; and
    the plurality of mounting elements being distributed about the impermeable layer, opposite to the excretion surface.

16. The pet training pad apparatus as claimed in claim 1, wherein the pet training pad apparatus further comprises:
    a color changing indicator; and
    the color changing indicator being connected along the excretion surface.

17. The pet training pad apparatus as claimed in claim 1, wherein:
    the visually stimulating indicium further comprises at least one UV marker pigment; and
    the UV marker pigment being distributed along the visually stimulating indicium.

* * * * *